(12) United States Patent
Gorianz

(10) Patent No.: US 11,692,682 B2
(45) Date of Patent: Jul. 4, 2023

(54) REAR LIGHT UNIT OF A VEHICLE AND METHOD FOR CONTROLLING THE LIGHTING OF SAID REAR LIGHT UNIT

(71) Applicant: ITALDESIGN-GIUGIARO S.P.A., Turin (IT)

(72) Inventor: Remo Gorianz, Turin (IT)

(73) Assignee: ITALDESIGN-GIUGIARO S.P.A., Turin (IT)

(*) Notice: Subject to any disclaimer, the term of this patent is extended or adjusted under 35 U.S.C. 154(b) by 128 days.

(21) Appl. No.: 17/435,843

(22) PCT Filed: Mar. 3, 2020

(86) PCT No.: PCT/IB2020/051769
§ 371 (c)(1),
(2) Date: Sep. 2, 2021

(87) PCT Pub. No.: WO2020/178722
PCT Pub. Date: Sep. 10, 2020

(65) Prior Publication Data
US 2022/0154906 A1 May 19, 2022

(30) Foreign Application Priority Data
Mar. 4, 2019 (IT) .................. 102019000003119

(51) Int. Cl.
*F21S 43/14* (2018.01)
(52) U.S. Cl.
CPC .................... *F21S 43/14* (2018.01)
(58) Field of Classification Search
CPC ..... B60Q 1/444; B60Q 1/2607; B60Q 1/0052
See application file for complete search history.

(56) References Cited

U.S. PATENT DOCUMENTS

| | | | | |
|---|---|---|---|---|
| 4,951,179 A | * | 8/1990 | Machida | F21V 5/04 362/249.14 |
| 2002/0053878 A1 | * | 5/2002 | Masaki | B60Q 1/44 315/77 |

(Continued)

FOREIGN PATENT DOCUMENTS

| | | |
|---|---|---|
| EP | 1955895 A1 | 8/2008 |
| FR | 3036168 A1 | 11/2016 |

OTHER PUBLICATIONS

International Search Report, issued in PCT/IB2020/051769, dated Jun. 25, 2020, Rijswijk, Netherlands.

*Primary Examiner* — Eric T Eide
(74) *Attorney, Agent, or Firm* — Valauskas Corder LLC

(57) ABSTRACT

A rear light unit of a vehicle is provided. The rear light unit includes an array of first light sources, arranged angularly offset along a first inner circumferential arrangement region, and an array of second light sources, arranged angularly offset at least along a second outer circumferential arrangement region concentric to the first inner circumferential arrangement region of the first light sources. The first and second light sources are made by one or more light-emitting diodes with which a light diffusing body is associated, the first light sources having a diffuser body in the form of a prismatic pinnacle, and the second light sources having a blade-shaped diffuser body along whose median axis emerges orthogonally a septum which enters the first inner circumferential arrangement region of the first light sources according to radial directions inserted between two successive light sources.

7 Claims, 3 Drawing Sheets

(56) References Cited

U.S. PATENT DOCUMENTS

| | | |
|---|---|---|
| 2004/0240225 A1 | 12/2004 | Batiste |
| 2007/0127256 A1 | 6/2007 | Uchida et al. |
| 2008/0258898 A1 | 10/2008 | Yang |
| 2015/0137965 A1* | 5/2015 | Lanham ................ B60Q 1/444 340/479 |
| 2017/0036591 A1 | 2/2017 | Chen |
| 2019/0366915 A1* | 12/2019 | Kiefaber .............. B60Q 1/2611 |

* cited by examiner

REAR LIGHT UNIT OF A VEHICLE AND METHOD FOR CONTROLLING THE LIGHTING OF SAID REAR LIGHT UNIT

CROSS-REFERENCE TO RELATED APPLICATIONS

This application is a U.S. National Phase filing of PCT International Patent Application No. PCT/IB2020/051769, having an international filing date of Mar. 3, 2020, which claims priority to Italian Patent Application No. 102019000003119, filed Mar. 4, 2019 each of which is hereby incorporated by reference in its entirety.

FIELD OF THE INVENTION

The present invention relates to the rear lamps or light units of a vehicle and more specifically to a rear light unit of a vehicle and a method for controlling the lighting of said light unit.

BACKGROUND OF THE INVENTION

The lighting of a light unit or lamp of a vehicle, in particular a rear lamp, traditionally takes place by switching a special selector on board the vehicle from a first light off position to a second light on position, typically corresponding to the lighting of the driving lights or dipped beam headlamps of the vehicle, or by starting the (engine of the) vehicle if the selector is preset in the light on position.

The lighting is normally perceived by a subject outside the vehicle due to the constant lighting that the lamp takes on and the rapid increase in the brightness of the light source (or light sources) of the lamp is almost imperceptible when switching from the off to the on condition.

LED light sources are increasingly widespread in vehicles for the construction of front light units, or headlights (or headlamps), and rear light units, or lamps, which not only offer greater efficiency in terms of life span and consumption of electric power, control of the directionality of the beam and homogeneity of lighting, but also lend themselves to a free spatial configuration, without constraints related to the size of the light source and the related power supply connections, as it would be in the case of bulb lamps. The use of LED light sources in automotive headlights and lamps takes place through the arrangement of linear arrays or two-dimensional arrays of LEDs within a diffuser body, the LEDs themselves emitting light at different wavelengths, therefore of different colors, for the different intended uses in the automotive sector according to the road traffic rules. Furthermore, it is known that LED array light sources can be controlled with varying intensities and the individual elements can be activated at variable times so as to obtain dynamic chromatic effects, for example in the direction indicators so as to generate an incremental lighting effect in the turning direction or as moving from the direction of travel.

SUMMARY OF THE INVENTION

The object of the present invention is to provide an efficient rear light unit for a vehicle, as well as to visually signal an ongoing starting condition of a vehicle through the vehicle lamps. Another object is to provide the vehicle with an innovative dynamic aesthetic effect.

According to the present invention, these objects are achieved by a rear light unit of a vehicle as described and claimed herein.

A further subject of the invention is a method for controlling the lighting of a vehicle lamp as claimed.

Particular embodiments are also described.

In summary, the present invention is based on the principle of implementing a vehicle lighting system, specifically a rear light unit, by means of a plurality of arrays of LED light sources, and of controlling the relative switching on and off of said arrays in a determined period of time, following a vehicle start command, in such a way as to represent a dynamic lighting effect, in particular a lighting effect similar to that which is generated in an aeronautical or aerospace jet engine. The lighting effect is such that first an array of inner circular light sources, preferably of orange or yellow light, lights up in a flashing mode, then an array of outer circular light sources, whose emitting surface is greater than the emitting surface of the array of inner light sources, preferably of red light, with initially increasing, then decreasing light intensity.

BRIEF DESCRIPTION OF THE FIGURES

Further features and advantages of the invention will appear more clearly from the following detailed description of an embodiment thereof, given by way of non-limiting example with reference to the accompanying drawing, in which.

DETAILED DESCRIPTION

Figure 1:
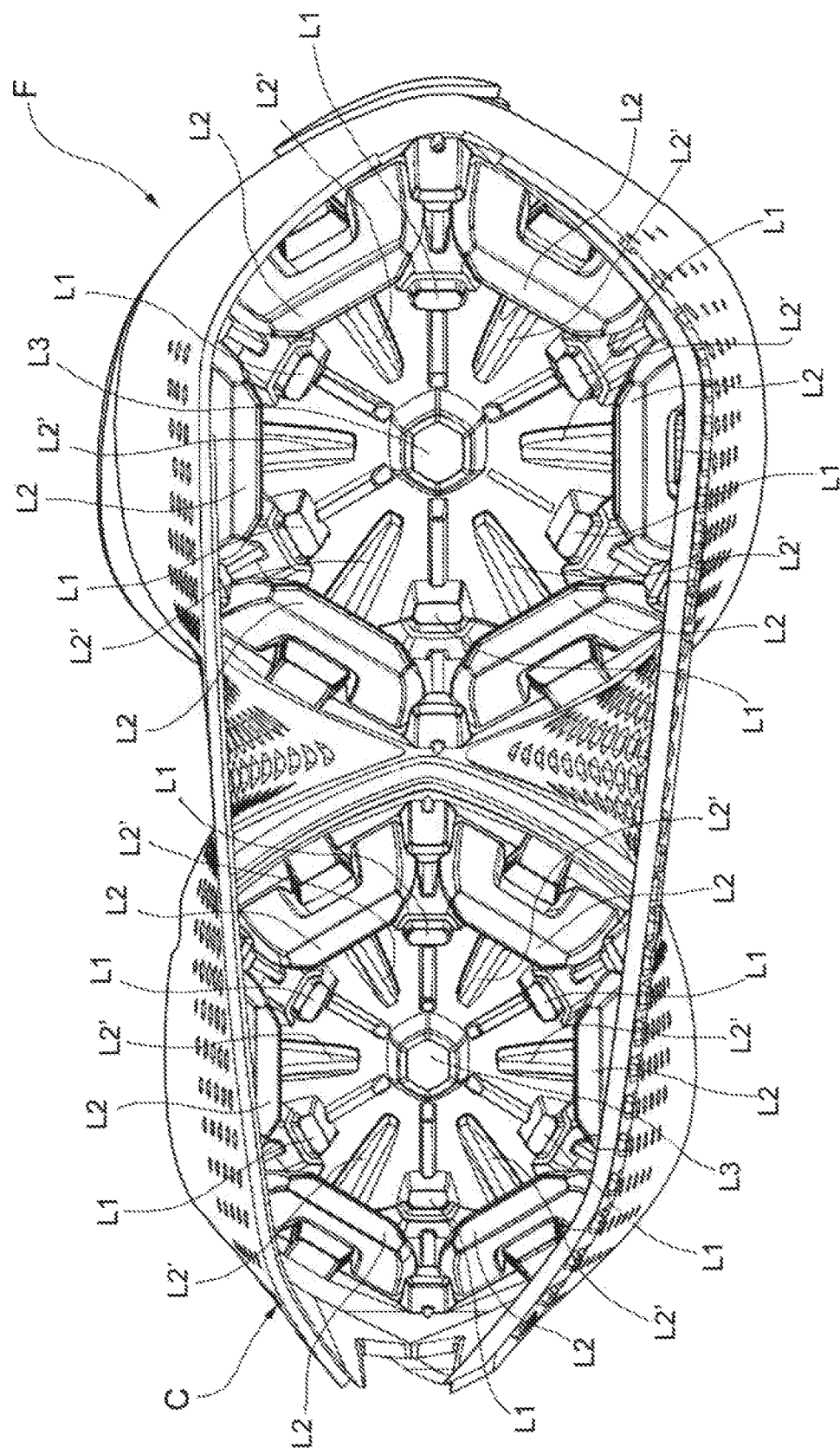
FIG. 1 shows a rear light unit of a vehicle in one embodiment of the invention.

FIG. 1 shows a rear light unit or lamp of a vehicle according to a currently preferred embodiment of the invention, in particular a right rear light unit, indicated as a whole with F.

The light unit F is housed in a body or shaped casing C which defines two seats side by side, of a generally circular shape, within which there are different light sources which create—in each seat—an overall lighting arrangement of the light unit.

The overall lighting arrangement of the light unit comprises an array of first light sources L1, arranged angularly offset along an inner circumferential region, and an array of second light sources L2 arranged, also angularly offset, concentrically to the first light sources L1 along an outer circumferential region, and partially entering the array of first light sources L1 according to radial directions inserted between two successive light sources L1. A third, preferably single, light source L3 is arranged axially to the array of the first light sources L1 and to the array of the second light sources L2.

Each light source L1, L2 and L3 is made by means of one or more light-emitting diodes, or LEDs, with which a light diffuser body acting as a light guide is associated to convey and diffuse the light generated by the source, for example arranged at its bottom.

The first light sources L1 have a diffuser body in the shape of a prismatic pinnacle, and preferably include one or more light-emitting diodes (LED) for the diffusion of orange or yellow light adapted to realize a direction indicator.

The second light sources L2 have a blade-shaped diffuser body along whose median axis, from the face facing the interior of the arrangement, a septum L2' emerges orthogonally which radially penetrates the circumferential region where the first light sources L1 are arranged, substantially radially distributing itself concentrically to the third light source L3. They preferably include one or more light-emitting diodes (LEDs) for the diffusion of red light of variable intensity adapted to realize a tail and/or stop light.

The third light source L3 has a gem-shaped diffuser body arranged at the top of a supporting cusp and preferably includes one or more light-emitting diodes (LEDs) for the diffusion of white light adapted to realize a reverse light.

Figure 2:
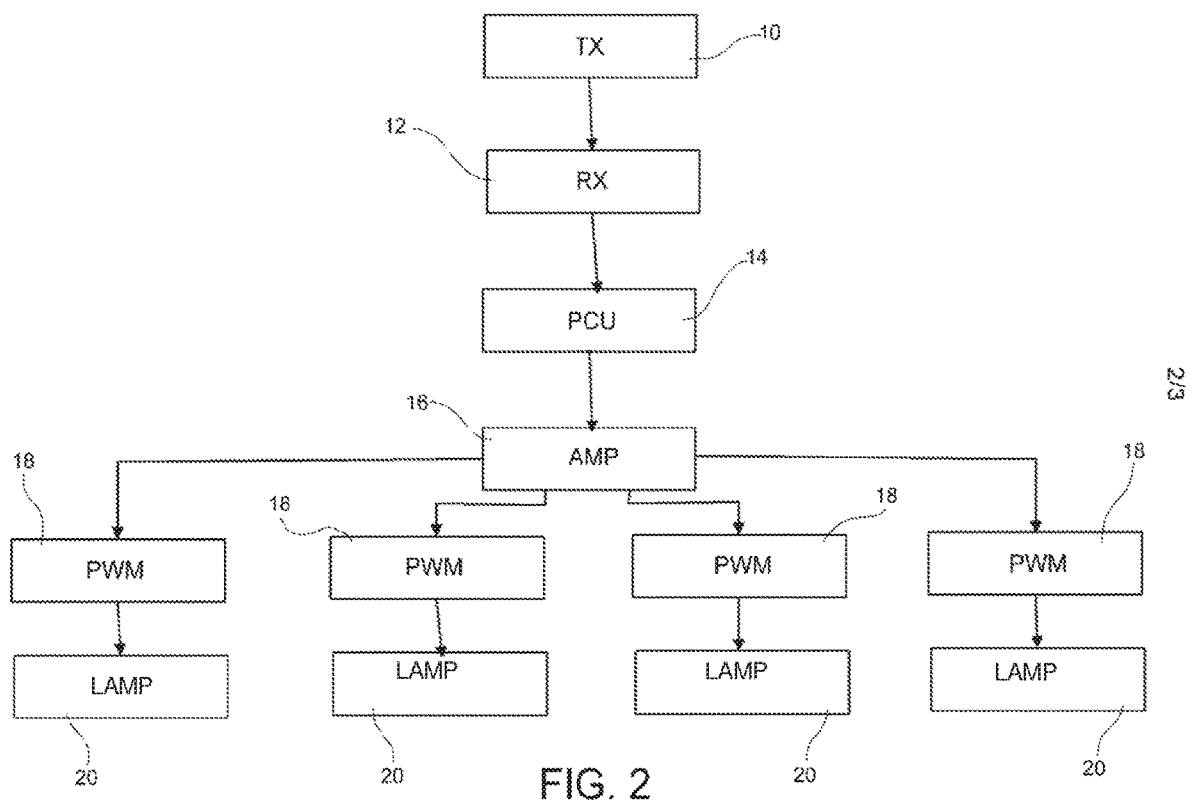
FIG. 2 shows a block diagram of a system for controlling the lighting of the light unit of FIG. 1.

FIG. 2 shows a block diagram of a system for controlling the lighting of the light unit F.

A remote control unit or ignition key 10 owned by a vehicle driver is adapted to be operatively connected in communication, for example in wireless communication, with a module 12 for receiving vehicle start signals, arranged on board the vehicle, for example integrated or coupled to a programmable control unit 14 of the vehicle. The module 12 for receiving vehicle start signals is designed to receive a vehicle start signal emitted by the remote control unit or ignition key and consequently inform the control unit 14 that a vehicle start is in progress. The control unit 14 is coupled to a power amplifier module 16 to which it selectively supplies, according to a predetermined and programmable timing, lighting signals of the lighting arrangement of the light unit. This occurs, for example, as a consequence of receiving a signal indicative of a vehicle start. The power amplifier module 16 is coupled to a plurality of PWM control modules 18, each associated with a respective lamp element 20, in this case a light unit F or a lighting arrangement thereof. The PWM control modules 18 are adapted to control an electrical signal to supply the light sources forming part of the corresponding lighting arrangement, the timing of which is preset by the control unit 14, the intensity of the light emission being controlled by the unit 14 by adjusting the duty cycle of the electrical supply signal by means of the control modules 18.

Figure 3:
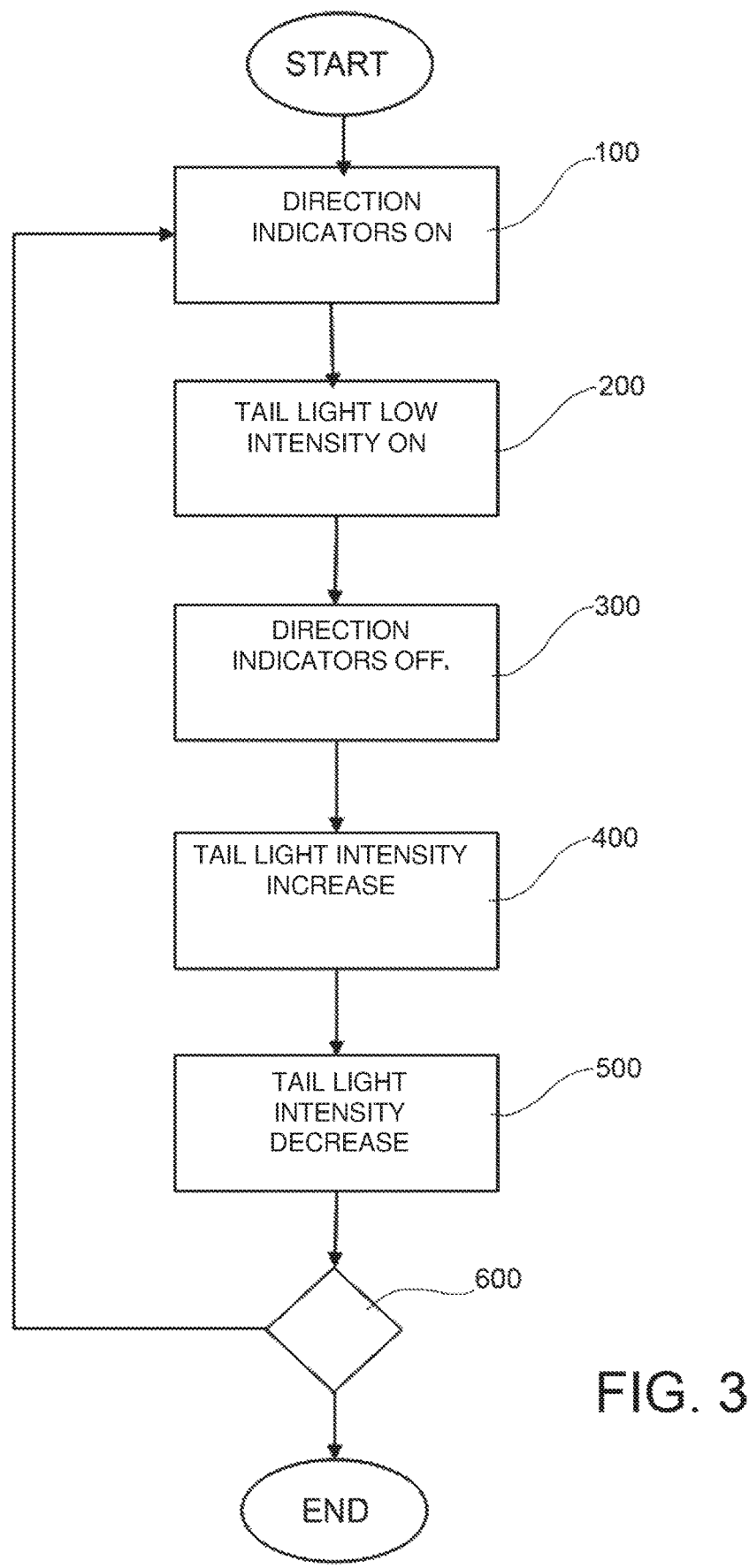
FIG. 3 shows a flowchart of a method for controlling the lighting of the light unit of FIG. 1.

FIG. 3 shows a flow diagram of a method for controlling the lighting of the light unit F.

The start of the process can be triggered by a vehicle start signal, as described in the present embodiment, or by another process trigger signal, for example generated by the voluntary actuation of a control device by the driver or by a vehicle maneuver, for example an acceleration maneuver.

When the process starts, in step 100 the array of the first light sources L1 is switched on. The lighting on of the sources L1 is controlled in a flashing mode, for example with a period of permanence in the on and off condition equal to 0.1 seconds, for a predefined total flashing time or for a predefined total number of flashes. In an exemplary embodiment, at least all the light sources L1 of a lighting arrangement and preferably all the light sources L1 of a light unit are controlled in synchronous flashing mode. Alternatively, it is possible to turn on the sources L1 in succession over time, according to their spatial arrangement or according to another programmed lighting model.

At step 200, the array of the second light sources L2 switches on at a first level of minimum predetermined light intensity.

Then in step 300, the array of first light sources L1 switches off, i.e. their flashing stops, and subsequently, in step 400, the light intensity of the second light sources L2 is increased, according to a predetermined increase curve, for example a linear increment curve. Upon reaching a predetermined maximum intensity threshold, or after a predetermined time, the light intensity of the second light sources L2 is decreased at step 500 according to a predetermined decrease curve, for example a linear decrease curve.

Subsequently, at step 600 a cycle condition is evaluated as a function of a predetermined number of iterations of the control process described above. Steps 100-500 are iterated for a predetermined number of times, after which the process ends, switching to a state in which the light unit remains on, for example in a lighting condition of tail lights, or in a state in which the light unit remains off, waiting for a lighting command by means of the activation of an on board selector of the lighting system.

Advantageously, with the succession of lighting commands of the arrays of sources L1 and L2, and by virtue of their mutual spatial arrangement, as well as by effect of the different light emission color, it is possible to produce a dynamic light effect of the rear light units of a vehicle depending on a vehicle start command, and this dynamic light effect is similar to the light effect that is generated in an aeronautical or aerospace jet engine.

Of course, the principle of the invention being understood, the manufacturing details and the embodiments may widely vary compared to what described and illustrated by way of a non-limiting example only, without departing from the scope of the invention as defined in the appended claims.

The invention claimed is:

1. A rear light unit of a vehicle, comprising an array of first light sources adapted to emit orange or yellow light to provide a direction indicator and an array of second light sources adapted to emit red light of varying intensity to create a tail and/or stop light, wherein said first light sources are arranged angularly offset along a first inner circumferential arrangement region and said second light sources are arranged angularly offset at least along a second outer circumferential arrangement region concentric to the first inner circumferential arrangement region of the first light sources, and comprising a system for controlling lighting of said rear light unit including programmable control means of said first and second light sources adapted to emit switching signals of said first and second light sources according to a predetermined timing and to adjust an intensity of light emission of said first and second light sources, wherein said first and second light sources are made by one or more light-emitting diodes with which a light diffusing body is associated, the first light sources having a diffuser body in the form of a prismatic pinnacle, and the second light sources having a blade-shaped diffuser body along whose median axis emerges orthogonally a septum which enters the first inner circumferential arrangement region of said first light sources according to radial directions inserted between two successive light sources.

2. The rear light unit of claim 1, further comprising at least one third light source adapted to emit white light to provide a reversing light, arranged axially to the array of said first light sources and to the array of said second light sources, the at least one third light source having a gem-shaped diffuser body arranged at the top of a supporting cusp.

3. A method for controlling lighting of a rear light unit of a vehicle comprising an array of first light sources adapted to emit orange or yellow light to provide a direction indicator and an array of second light sources adapted to emit red light of varying intensity to provide a tail and/or stop light, wherein said first light sources are arranged angularly offset along a first inner circumferential arrangement region and said second light sources are arranged angularly offset at least along a second outer circumferential arrangement region concentric to said first inner circumferential arrangement region of the first light sources, and wherein said first and second light sources are made by one or more light-emitting diodes with which a light diffusing body is associated, the first light sources having a diffuser body in the form of a prismatic pinnacle, and the second light sources having a blade-shaped diffuser body along whose median axis emerges orthogonally a septum which enters the first inner circumferential arrangement region of said first light sources according to radial directions inserted between two successive light sources;

the method comprising the following operations in succession:

a) switching on said array of first light sources in a flashing mode, for a predefined total flashing time or for a total number of predefined flashes;
b) switching on said array of second light sources at a first level of minimum predetermined light intensity;
c) switching off said array of first light sources;
d) increasing the light intensity of said second light sources;
e) upon reaching a predetermined maximum intensity threshold, or after a predetermined time, decreasing of the light intensity of said second light sources, and iterating operations a)-e) for a predetermined number of times.

4. The method of claim 3, wherein said first light sources are controlled in synchronous flashing mode.

5. The method of claim 3, wherein said operations are triggered by a vehicle start signal.

6. The method of claim 3, wherein said operations are triggered by an acceleration maneuver of the vehicle.

7. The method of claim 3, wherein said first light sources emit orange or yellow light adapted to provide a direction indicator and said second light sources emit red light of variable intensity adapted to provide a tail and/or stop light.

* * * * *